United States Patent [19]

Nzei

[11] Patent Number: 4,932,644
[45] Date of Patent: Jun. 12, 1990

[54] SHEET FEEDING PROCESS

[75] Inventor: Paul F. Nzei, Dayton, Ohio

[73] Assignee: The Mead Corporation, Dayton, Ohio

[21] Appl. No.: 349,990

[22] Filed: May 8, 1989

Related U.S. Application Data

[63] Continuation of Ser. No. 143,432, Jan. 13, 1988, abandoned.

[51] Int. Cl.$^5$ ............................................. B65H 39/00
[52] U.S. Cl. ........................................... 270/52; 271/1; 355/311
[58] Field of Search ............................. 270/52, 58, 59; 271/279, 287, 288, 298, 1; 355/308, 309, 311, 316, 321, 133

[56] References Cited

U.S. PATENT DOCUMENTS

| | | | |
|---|---|---|---|
| 3,266,406 | 8/1966 | Stievenart | 271/285 |
| 3,452,980 | 7/1969 | Yanagawa | 271/285 |
| 3,964,095 | 6/1976 | Kihara | 271/285 |
| 4,471,954 | 9/1984 | Bourg | 270/58 |
| 4,567,081 | 1/1986 | Vanhorne | 271/1 |
| 4,609,282 | 9/1986 | Crandall | 355/14 SH |
| 4,738,442 | 4/1988 | Rodi | 271/261 |

Primary Examiner—Robert E. Garrett
Assistant Examiner—Therese M. Newholm
Attorney, Agent, or Firm—Biebel, French & Nauman

[57] ABSTRACT

The present invention provides a process for feeding transparency sheets having a soft coating thereon from a tray of such sheets. The transparency sheets are interleaved with plain paper separator sheets in a tray so that at the front end of the tray, the ends of the plain paper separator sheets extend beyond the ends of the transparency sheets. A sheet feed means positioned adjacent the front end of the tray engages the extended end of the first of the plain paper separator sheets in the tray. At start up, the sheet feed means does not engage the transparency sheets. The sheet feed means moves the engaged plain paper separator sheet from the tray wherein the movement of the engaged plain paper separator sheet moves the adjacent transparency sheet from the tray.

5 Claims, 2 Drawing Sheets

SHEET FEEDING PROCESS

This is a continuation of Ser. No. 143,432 filed Jan. 13, 1988 now abandoned.

BACKGROUND OF THE INVENTION

The present invention relates to a process for feeding transparency sheets and an apparatus useful therein.

One popular visual aid used in business and educational settings involves projecting the desired information from a transparent sheet onto a screen so that the information is simultaneously visible to numerous members of the audience. Typically, the transparency material contains the information which is then projected onto the screen by a projection apparatus such as an overhead projector. A reproduction apparatus such as a printer or electrographic copier is typically used to produce copies of original information on the transparency material.

However, transparency material has proven difficult to handle in typical reproduction apparatus because of certain inherent characteristics of transparency material. Typically, transparency material comprises nonfibrous flexible polymeric sheets which have a relatively high coefficient of friction and a high propensity to surface electrostatic charge build-up. As a result, transparency sheets tend to stick together due to the charge build-up and are hard to feed individually through reproduction apparatus.

A solution to the problem of feeding individual transparency sheets through reproduction apparatus has been to interleave plain paper separator sheets between adjacent transparency sheets as disclosed in U.S. Pat. No. 4,609,282. The transparency sheets and interleaved plain paper separator sheets are fed seriatim through the reproduction apparatus. The interleaving of the transparency sheets and the plain paper separator sheets facilitates sheet handling in the reproduction apparatus by reducing the effect of the high coefficient of friction of the transparency sheets and by preventing transparency sheets from sticking together due to surface charge buildup.

Even with the use of paper separator sheets, transparency sheets which have a soft coating thereon still present handling problems. Typical sheet or paper feed mechanisms for feeding the first paper sheet from a stack of such sheets commonly employ fixed feed wheels which move into engagement with the exposed sheet to cause the separation and feeding of the sheet usually by an initial buckling movement of the sheet. The sheet is then released from the stack so that the sheet may be fed through take-away rolls from the stack. The feed wheels usually remain at a fixed location in relation to the stack.

The problem which arises in feeding transparency sheets having a soft coating thereon from a stack is that the feed wheels easily damage the soft coating on the contacted transparency sheet and on the underlying transparency sheets by excessive localized pressure. This problem is especially prevalent upon start up, when sheet-to-sheet friction must be overcome and the feed wheels must get a grip on the transparency sheet to be moved. As such, the foregoing paper feed mechanisms are not useful in feeding transparency sheets having a soft coating thereon. The developer sheets described in commonly assigned U.S. Pat. No. 4,399,209 are an example of transparency sheets having a soft coating thereon which may be easily damaged by excessive localized pressure.

As such, a need exists in the art for a process for feeding transparency sheets and an apparatus useful therein wherein damage does not occur to the soft coating on the transparency sheets.

SUMMARY OF THE INVENTION

The present invention provides a sheet feeding process. Transparency sheets are interleaved with plain paper separator sheets in a tray so that at the front end of the tray, the ends of the plain paper separator sheets extend beyond the ends of the transparency sheets. A sheet feed means positioned adjacent the front end of the tray engages the extended end of the first of the plain paper separator sheets in the tray. The sheet feed means does not initially engage the transparency sheets. A sheet feed means moves the engaged plain paper separator sheet from the tray wherein the movement of the engaged plain paper separator sheet moves the adjacent transparency sheet from the tray.

The present process can be used in any situation which requires feeding of transparency sheets. For example, the present process can be used in feeding transparency sheets into reproduction apparatus. The interleaving of the transparency sheets and the plain paper separator sheets facilitates transparency sheet handling in the reproduction apparatus by reducing the effect of the high coefficient of friction of the transparency sheets and by preventing the transparency sheets from sticking together due to surface charge build-up.

As a further example, the present process can be used in feeding transparency sheets into a projection apparatus. At this stage in the life of the transparency sheet, the transparency sheet contains image information which may be in the form of a soft coating. Because the sheet feed means of the present invention does not initially contact the transparency sheets, damage does not occur to the soft coating on the adjacent or underlying transparency sheets. As such, the present process allows for machine feeding of transparency sheets having a soft coating thereon, and thus, meets the need in the art.

The present invention also provides a sheet feed mechanism for practicing the present process. The sheet feed mechanism comprises a tray containing transparency sheets interleaved with plain paper separator sheets wherein at the front end of the tray, the ends of the plain paper separator sheets extend beyond the ends of the transparency sheets. A sheet feed means is positioned adjacent the front end of the tray. The sheet feed means has a sheet-engaging portion in engagement with the extended portion of the first plain paper separator sheet in the tray.

As such, an object of the present invention is to provide a process for feeding transparency sheets and an apparatus useful therein.

A more particular object of the present invention is to provide a process for feeding transparency sheets having a soft coating thereon and an apparatus useful therein.

Other objects and advantages of the present invention will become apparent from the following description, the accompanying drawings, and the appended claims.

DETAILED DESCRIPTION OF THE PREFERRED EMBODIMENTS

The present sheet feeding process comprises interleaving transparency sheets with plain paper separator sheets in a tray so that at the front end of the tray, the ends of the plain paper separator sheets extend beyond the ends of the transparency sheets. Useful plain paper separator sheets have a coefficient of friction which approximates that of plain paper which is typically run through sheet feed equipment. Typically, the plain paper separator sheets used in the present invention have a width substantially equal to the width of the transparency sheets.

Figure 1:
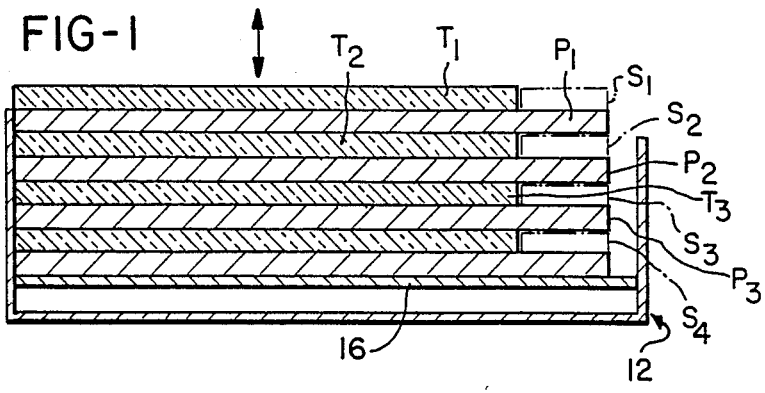
FIG. 1 is a side view of one arrangement of interleaved transparency sheets and plain paper separator sheets.

To illustrate the interleaving of the transparency sheets with plain paper separator sheets in a tray, FIG. 1 shows one possible arrangement. In this arrangement, the plain paper separator sheets have a length which is greater than the length of the transparency sheets. $T_1$ represents the first transparency sheet in the stack while $P_1$ represents the first plain paper separator sheet in the stack. The transparency sheets ($T_1$, $T_2$, and $T_3$) are interleaved feed means does not exert pressure on the underlying transparency sheets $T_2$, $T_3$, etc. by translation, $T_2$, $T_3'$ etc. are not subjected to excessive pressure which could damage the soft coating thereon.

The sheet feed means moves the engaged plain paper separator sheet $P_1$ from the tray 12 such that movement of the engaged plain paper separator sheet $P_1$ moves the adjacent transparency sheet $T_1$ from the tray 12. As such, the first plain paper separator sheet $P_1$ and the first transparency sheet $T_1$ are moved as a unit from the tray 12. Typically within a unit, the soft coating on the transparency sheet, e.g. $T_1$, is away from the plain paper separator sheet, e.g. $P_1$.

It should be understood that after the first plain paper separator sheet $P_1$ has been moved from the tray 12, plain paper separator sheet $P_2$ is the next plain paper separator sheet on the top of the stack. As such, sheet feed means positioned adjacent the front end of the tray 12 engages the extended end of the plain paper separator sheet $P_2$ and moves the plain paper separator sheet $P_2$ from the tray 12 wherein the movement of the engaged plain paper separator sheet $P_2$ moves adjacent transparency sheet $T_2$ from the tray 12. Such sheet feeding continues until the desired number of transparency sheets have been fed from the tray 12.

In another possible arrangement (not illustrated), the plain paper separator sheets have a length which is greater than the length of the transparency sheets as in the arrangement of FIG. 1. Unlike the FIG. 1 arrangement, plain paper separator sheet $P_1$ is the top sheet in the stack while transparency sheet $T_1$ is the second sheet from the top in the stack. The remaining plain paper separator sheets ($P_2$, $P_3$, and $P_4$) are interleaved with transparency sheets ($T_2$, $T_3$, and $T_4$) in the tray in this manner.

Figure 2:
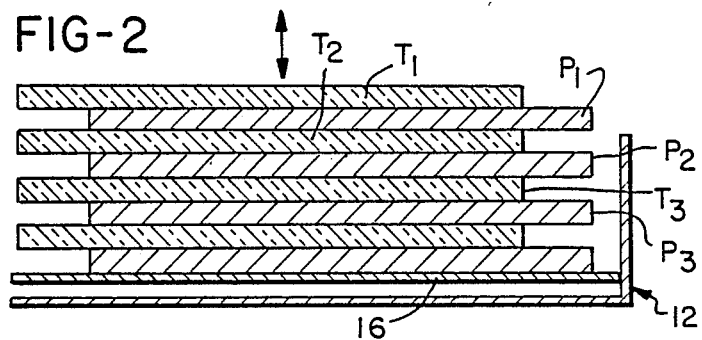
FIG. 2 is a side view of another arrangement of interleaved transparency sheets with plain paper separator sheets.

To further illustrate the interleaving of transparency sheets with plain paper separator sheets in a tray, FIG. 2 illustrates another possible arrangement. In this arrangement, the interleaved plain paper separator sheets have a length substantially equal to the length of the transparency sheets. Comparable to FIG. 1, $T_1$ in FIG. 2 represents the first transparency sheet in the stack while $P_1$ represents the first plain paper separator sheet in the stack. The transparency sheets ($T_1$, $T_2$, and $T_3$) are interleaved with plain paper separator sheets ($P_1$, $P_2$, and $P_3$) in a tray 12 so that at the front end of the tray 12, the ends of the plain paper separator sheets extend beyond the ends of the transparency sheets.

Although not illustrated in FIG. 2, a sheet feed means positioned adjacent the front end of tray 12 engages the extended end of the first of the plain paper separator sheets $P_1$ in the tray 12. Again, because the sheet feed means does not contact the adjacent transparency sheet $T_1$ at start up, $T_1$ is not subjected to excessive localized pressure by the sheet feed means. Also, because the sheet feed means does not exert pressure on the underlying transparency sheets $T_2$, $T_3$, etc. by translation, $T_2$, $T_3$, etc. are not subjected to excessive pressure which could damage the soft coating thereon.

The sheet feed means moves the engaged plain paper separator sheet $P_1$ from the tray 12 so that movement of the engaged plain paper separator sheet $P_1$ moves the adjacent transparency sheet $T_1$ from the tray 12. As such, the first plain paper separator sheet $P_1$ and the first transparency sheet $T_1$ are moved as a unit from the tray 12. Comparable to FIG. 1, engaged plain paper separator sheets and their adjacent transparency sheets are moved as units from the tray 12 until the desired number of transparency sheets are fed therefrom.

Figure 3:
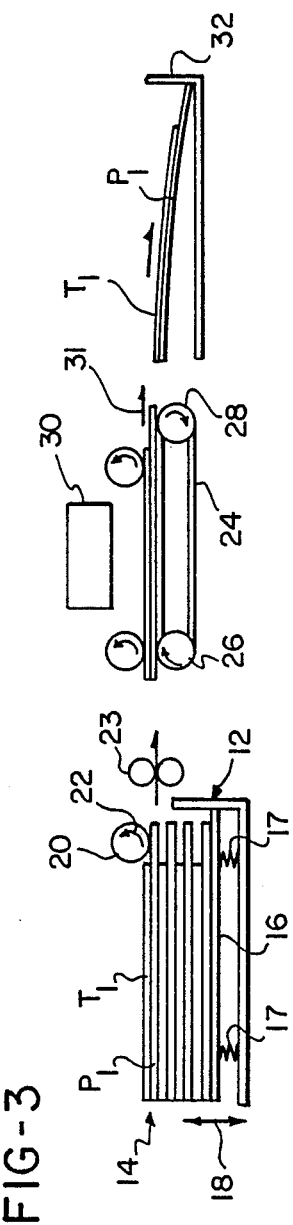
FIG. 3 is a diagrammatic representation of a sheet feed mechanism in accordance with the present invention in a reproduction apparatus.

FIG. 3 shows a forward buckling, top feed or top delivery sheet feed mechanism. In such a top delivery or top feed mechanism, a stack 14 of interleaved transparency sheets and plain paper separator sheets are mounted in the tray 12. The bottom 16 of the tray 12 is movable due to the springs 17 in the direction indicated by the arrow 18 so as to provide plain paper separator sheets to the sheet feed means. An elevator may also be useful for this purpose. The feed device or wheel diagrammatically represents a wide paper feed wheel 20 which is driven counterclockwise in the direction of the arrow 22 as in a conventional forward-buckling sheet feed device.

A sheet delivery apparatus of conventional construction in which a feed wheel causes the top sheet in a tray to be buckled forwardly against a snubber for separation from the second and subsequent sheets in the stack of sheets is shown in U.S. Pat. No. 3,713,645 which is incorporated herein to the extent necessary to complete this disclosure. The first plain paper separator sheet $P_1$ is forward fed by frictional engagement with the feed wheel 20 in a direction generally parallel to the plane of sheets in the stack 14. The feed wheel 20 generally remains at a fixed location with respect to the stack 14 of sheets. In this case, the feed wheel 20 engages the ends of the plain paper separator sheets which extend beyond the end of the transparency sheets. A typical feed wheel 20 has a width which is relatively narrow with respect to the width of the sheets.

For feeding into a reproduction apparatus, the unit of the first plain paper separator sheet P1 and the adjacent transparency sheet $T_1$ is moved to take-away rolls 23. As such, feed wheel 20 is only required to move the unit of the first plain paper separator sheet $P_1$ and the adjacent transparency sheet $T_1$ to take-away rolls 23. After the take-away rolls 23 engage first plain paper separator sheet $P_1$, scuffing risk by feed wheel 20 is eliminated.

The unit is then moved onto a belt 24 which is placed around rollers 26 and 28. The belt 24 transports the unit to a conventional reproduction unit 30. The reproduction unit 30 may be a printer or an electrographic copier. It should be understood that the transparency sheet $T_1$ is adjacent to the reproduction unit 30 so that the reproduction unit 30 can place image information in a conventional manner on the transparency sheet $T_1$. The belt 24 then moves the unit of the plain paper separator sheet $P_1$ and the adjacent transparency sheet $T_1$ having image information thereon as indicated by the arrow 31 into a second tray 32.

Successive units of plain paper separator sheets and adjacent transparency sheets are moved through the reproduction unit 30 until the desired number of transparency sheets having image information thereon is generated.

With some sheet feeders, sagging of the ends of the plain paper separator sheets could prevent feed wheel 20 from engaging them. To eliminate this problem, transparency strips $S_1$, $S_2$, $S_3$, $S_4$ etc. can be placed on the ends of the plain paper separator sheets as shown in FIG. 1 in order to keep the stack uniform.

Figure 6:
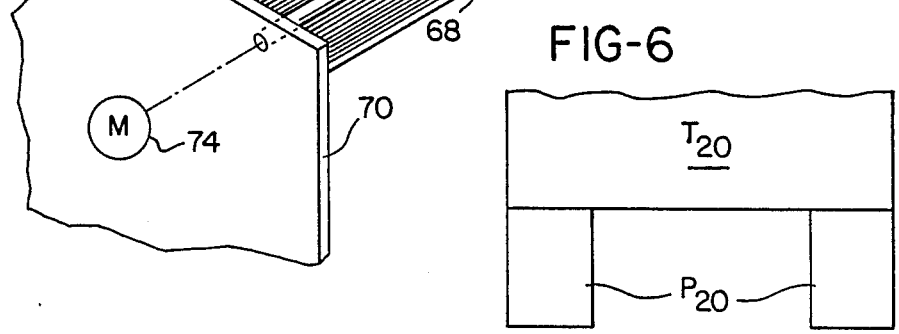
FIG. 6 is a top view of a plain paper separator sheet having an optical timing mark therein.
Figure 6:
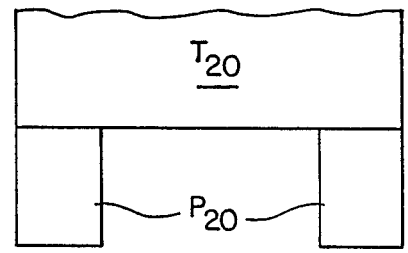

An optical sensor may be useful for detecting the position of a transparency sheet in a sheet handling apparatus such as a reproduction apparatus. Because optical sensors cannot detect a transparency sheet due to its transparent nature, the adjacent plain paper separator sheet $P_{20}$ can have an optical timing mark such as a notch in one end thereof as shown in FIG. 6. When the unit of plain paper separator sheet $P_{20}$ and adjacent transparency sheet $T_{20}$ are moved, an optical sensor can align the position of $T_{20}$ due to the notch in $P_{20}$. Preferably, the notch is in the center of $P_{20}$ has a one-inch width, and has a back edge which is aligned with the leading edge of $T_{20}$.

As is known in the art, the position of a given transparency sheet can be determined on a sensor basis or a precalculated basis. With the latter, provided that a machine knows that transparency sheets are in a tray, that the transparency sheets are interleaved with plain paper separator sheets, and that the ends of the plain paper separator sheets extend beyond the transparency sheets for a given distance, timing can be precalculated within the machine.

Figure 4:
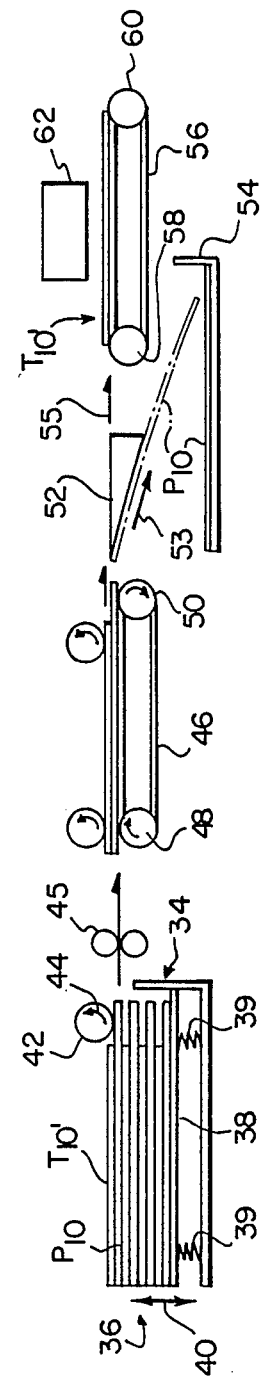
FIG. 4 is a diagrammatic representation of a sheet feed mechanism in accordance with the present invention in a projection apparatus.

The present process for feeding transparency sheets having a soft coating thereon can be used for feeding the transparency sheets into a projection apparatus such as is commonly done in business environments. As shown in FIG. 4, a tray 34 contains a stack 36 of plain paper separator sheets and transparency sheets having a soft coating thereon. Each transparency sheet has image information thereon which is desired to be displayed in a projection apparatus. $T_1$ represents that the transparency sheet does have image information thereon in the form of a soft coating. The bottom 38 of tray 34 is movable due to the springs 39 in the direction indicated by the arrow 40 so as to provide transparency sheets to the conventional feed wheel 42. An elevator may also be useful for this purpose. The feed wheel 42 is driven counterclockwise in the direction of the arrow 44 as in a conventional forward-buckling sheet feed device.

The feed wheel 42 positioned adjacent the front end of the tray 34 engages the extended end of the first of the plain paper separator sheets $P_{10}$ in the tray 34 and moves the engaged plain paper separator sheet $P_{10}$ from the tray 34 to take-away rolls 45 wherein the movement of $P_{10}$ moves the adjacent transparency sheet $T_{10}'$ from the tray 34. After take-away rolls 45 engage plain paper separator sheet $P_{10}$, scuffing risk by feed wheel 42 is eliminated.

The unit of the plain paper separator sheet $P_{10}$ and the adjacent transparency sheet $T_{10}$ is then moved onto a belt 46. The belt 46 is situated around rollers 48 and 50. The belt 46 transports the unit comprising plain paper separator sheet $P_{10}$ and transparency sheet $T_{10}'$ to a separator 52. The separator 52 separates the transparency sheet $T_{10}'$ from the plain paper separator sheet $P_{10}$.

As indicated by arrow 53, the plain paper separator sheet $P_{10}$ is directed into a second tray 54. The plain paper separator sheets collected in tray 54 may either be reused or discarded. As indicated by arrow 55, the transparency sheet $T_{10}'$ is directed onto a second belt 56 situated around rollers 58 and 60. The belt 56 transports the transparency sheet $T_{10}'$ to a conventional projection unit 62. The projection 62 may be, for example, an overhead projector.

Figure 5:
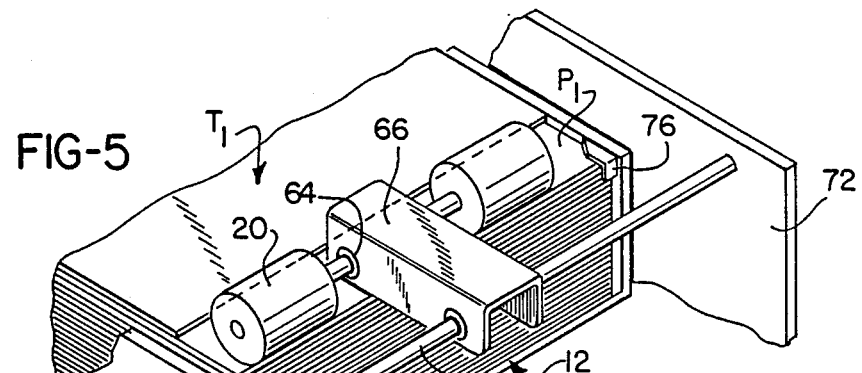
FIG. 5 is a perspective view, with parts being broken away to assist in illustrating, of the sheet feed mechanism.

FIG. 5 illustrates a drive mechanism for the feed wheel 20 of FIG. 3 and a mechanism for rotating the feed wheel in the direction of the arrow 22. Although not discussed, the drive mechanism of FIG. 5 is also useful for the feed wheel 42 of FIG. 4. In FIG. 5, two wide paper feed wheels 20 are mounted on a common drive shaft 64 in a drive shaft support housing 66. As shown, the feed wheels 20 have a relatively wide imprint which is approximately equal to about $\frac{1}{4}$ of the width of the plain paper separator sheets in the tray 12.

The housing 66 is mounted on a generally transversely-extending support or driver rod 68 whose ends terminate in side walls 70 and 72. Rotational movement of driver rod 68 by motor 74 is translated to feed wheels 20 to cause rotational movement thereof. Rotational movement of feed wheels 20 causes movement of a plain paper separator sheet against the corner snubbers 76 for lifting and delivery of the sheet to the belt 24.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A sheet feed mechanism comprising:
   a tray having a front end in the feed direction and containing transparency sheets interleaved with plain paper separator sheets to form a stack of such sheets in which the ends of said plain paper separator sheets extend in said stack at said front end beyond the ends of said transparency sheets;
   sheet feed means positioned adjacent said front end of said tray;
   said sheet feed means having a sheet-engaging portion positioned exclusively in engagement with the extended portion of the first plain paper separator sheet of said stack of sheets in said tray; and
   said feed means operable to dispense said first plain paper separator sheet from said stack of sheets and carry a said transparency sheet therewith as a unit.

2. The method of feeding sheets of transparency material in which said sheets have an easily damaged soft coating thereon, comprising the steps of:

interleaving said transparency sheets with plain paper separator sheets in a feed tray to form a stack of said sheets and positioning the plain paper sheets to extend outwardly of the transparency sheets in said stack, so that exposed portions of the separator sheets are engageable by a sheet feed mechanism without engaging the transparency sheets, and exclusively engaging said exposed plain paper separator sheet portions by a paper feed mechanism and causing movement of the engaged sheet in a feed direction, thereby carrying the associated transparency sheet therewith as a unit.

3. The method of claim 2 in which said plain paper sheets are offset from said transparency sheets in said feed direction to form forwardly exposed portions thereof engageable by the feed mechanism.

4. A sheet feed mechanism for dispensing soft coated transparency sheets interleaved with plain paper separator sheets from a stack of such sheets in a tray for protecting said transparency sheets against damage by the feed mechanism, comprising:

discrete portions of said plain paper separator sheets extending in said stack beyond a terminal edge of said associated transparency sheets, sheet feed means having a sheet-engaging portion positioned for exclusively engaging said plain paper separator sheet discrete extended portions without engaging the associated said transparency sheet, said sheet feed means being operable to dispense the engaged said plain paper separator sheet from said stack and the associated sadi transparency sheet as a unit.

5. The feed mechanism of claim 4 further comprising optical timing mark means associated with said discrete extended portions of said plain paper separator sheets.

* * * * *